(12) United States Patent
Zhou et al.

(10) Patent No.: US 12,461,723 B2
(45) Date of Patent: Nov. 4, 2025

(54) LEARNED GRAPH OPTIMIZATIONS FOR COMPILERS

(71) Applicant: Google LLC, Mountain View, CA (US)

(72) Inventors: Yanqi Zhou, Sunnyvale, CA (US); Sudip Roy, Sunnyvale, CA (US); Amirali Abdolrashidi, Riverside, CA (US); Daniel Lin-Kit Wong, Pittsburgh, PA (US); Chao Ma, Mountain View, CA (US); Qiumin Xu, Santa Clara, CA (US); Hanxiao Liu, Santa Clara, CA (US); Phitchaya Mangpo Phothilimthana, Mountain View, CA (US); Shen Wang, Sunnyvale, CA (US); Anna Darling Goldie, San Francisco, CA (US); Azalia Mirhoseini, Mountain View, CA (US); James Laudon, Madison, WI (US)

(73) Assignee: Google LLC, Mountain View, CA (US)

( * ) Notice: Subject to any disclaimer, the term of this patent is extended or adjusted under 35 U.S.C. 154(b) by 290 days.

(21) Appl. No.: 17/921,933

(22) PCT Filed: Jun. 7, 2021

(86) PCT No.: PCT/US2021/036250
§ 371 (c)(1),
(2) Date: Oct. 27, 2022

(87) PCT Pub. No.: WO2021/248138
PCT Pub. Date: Dec. 9, 2021

(65) Prior Publication Data
US 2023/0176840 A1 Jun. 8, 2023

Related U.S. Application Data

(60) Provisional application No. 63/035,640, filed on Jun. 5, 2020.

(51) Int. Cl.
*G06F 9/44* (2018.01)
*G06F 8/41* (2018.01)
(Continued)

(52) U.S. Cl.
CPC .............. *G06F 8/443* (2013.01); *G06F 8/451* (2013.01); *G06N 3/044* (2023.01)

(58) Field of Classification Search
CPC .......... G06F 8/443; G06F 8/451; G06F 8/433; G06N 3/045; G06N 3/44; G06N 3/08
See application file for complete search history.

(56) References Cited

U.S. PATENT DOCUMENTS 11,169,786 B2 * 11/2021 Badlani ...................... G06F 8/75
12,093,806 B1 * 9/2024 Zejda ...................... G06N 3/045
(Continued)

FOREIGN PATENT DOCUMENTS

CN 111126386 A * 5/2020 ............ G06F 18/214
WO WO-2019018332 A1 * 1/2019 ......... G06F 16/9024

OTHER PUBLICATIONS

Aditya Paliwal, Reinforced Genetic Algorithm Learning for Optimizing Computation Graphs, Feb. 2020, pp. 1-24. https://arxiv.org/pdf/1905.02494 (Year: 2020).*
(Continued)

*Primary Examiner* — Mongbao Nguyen
(74) *Attorney, Agent, or Firm* — Fish & Richardson P.C.

(57) ABSTRACT

Methods, systems, and apparatus, including computer programs encoded on computer storage media, for compiler optimizations using a compiler optimization network. One of the methods includes receiving an input program, wherein the input program defines a graph of operation modules, wherein each node in the graph is a respective operation module, and each edge between nodes in the graph represents one operation module receiving the output generated
(Continued)

by another operation module. The input program is processed by a compiler optimization network comprising a graph-embedding network that is configured to encode operation features and operation dependencies of the operation modules of the input program into a graph embedding representation and a policy network that is configured to generate an optimization action for each of one or more nodes encoded in the graph embedding representation. The compiler optimization network generates an output optimization plan comprising one or more optimization actions for the input program.

20 Claims, 4 Drawing Sheets

(51) Int. Cl.
   *G06F 9/445* (2018.01)
   *G06F 9/455* (2018.01)
   *G06N 3/044* (2023.01)

(56) References Cited

U.S. PATENT DOCUMENTS

| | | | | |
|---|---|---|---|---|
| 2019/0391796 | A1 | 12/2019 | Brady et al. | |
| 2020/0089755 | A1* | 3/2020 | Shazeer | G06F 18/285 |
| 2020/0104681 | A1* | 4/2020 | Li | G06F 16/903 |
| 2020/0249998 | A1* | 8/2020 | Che | G06N 20/00 |
| 2020/0293838 | A1* | 9/2020 | Li | G06F 18/2185 |
| 2021/0133591 | A1* | 5/2021 | Elango | G06N 3/04 |
| 2021/0182036 | A1* | 6/2021 | Shafiq | G06N 3/063 |
| 2021/0192314 | A1* | 6/2021 | Aarts | G06N 3/044 |
| 2021/0232873 | A1* | 7/2021 | Kothari | G06V 20/41 |
| 2021/0286831 | A1* | 9/2021 | Girardi | G06N 20/20 |

OTHER PUBLICATIONS

Zhilin Yang, Transformer-XL: Unleashing the Potential of Attention Models, 2019, pp. 1-6. https://research.google/blog/transformer-xl-unleashing-the-potential-of-attention-models/ (Year: 2019).*
English translation, Goldie (WO 2019018332 A1), 2019, pp. 1-14. (Year: 2019).*
Yao Wan, Improving Automatic Source Code Summarization via Deep Reinforcement Learning, 2018, pp. 1-12. https://arxiv.org/pdf/1811.07234 (Year: 2018).*
Chris Cummins, PROGRAML: Graph-Based Deep Learning for Program Optimization and Analysis, pp. 1-20, 2020. chrome-extension://efaidnbmnnnibpcajpcglclefindmkaj/https://arxiv.org/pdf/2003.10536 (Year: 2020).*
English translation, Zhou et al. (CN 111126386 A), 2020, pp. 1-9. (Year: 2020).*
Adams et al., "Learning to optimize halide with tree search and random programs," ACM Transactions on Graphics, Jul. 12, 2019, 38(4):1-12.
Addanki et al. "Placeto: Learning generalizable device placement algorithms for distributed machine learning," CoRR, Submitted on Jun. 20, 2019, ar Xiv: 1906.08879v1, 15 pages.
Ba et al., "Layer normalization," CoRR, Submitted on Jul. 21, 2016, arXiv: 1607.06450v1, 14 pages.
Chen et al., "Learning to optimize tensor programs," CoRR, Submitted on May 21, 2018, arXiv: 1805.08166v1, 17 pages.
Chen et al., "Learning to perform local rewriting for combinatorial optimization," CoRR, Submitted on Oct. 30, 2019, arXiv: 1810.00337v5, 20 pages.
Cheung et al., "Superposition of many models into one," CoRR, Submitted on Jun. 17, 2019, arXiv:1902.05522v2, 18 pages.
Ciosek et al., "Knossos: Compiling AI with AI," Proceedings of International Conference on Learning Representations, Sep. 25, 2019, 23 pages.

Dai et al., "Transformer-xl: Attentive language models beyond a fixed-length context," Proceedings of the 57th Annual Meeting of the Association for Computational Linguistics, Jul. 28-Aug. 2, 2019, pp. 2978-2988.
Dai, "Improving deep generative modeling with applications," Thesis for the degree of Doctor of Philosophy, Carnegie Mellon University, School of Computer Science, Sep. 19, 2019, 131 pages.
Devlin et al., "BERT: Pre-training of deep bidirectional transformers for language understanding," CoRR, Submitted on Oct. 11, 2018, arXiv:1810.04805v1, 14 pages.
Gao et al., "Spotlight: Optimizing device placement for training deep neural networks," Proceedings of the 35th International Conference on Machine Learning (PMLR), Jul. 10-15, 2018, 80:1676-1684.
Google for Developers [online], "XLA—TensorFlow, compiled," Mar. 6, 2017, retrieved on Feb. 16, 2024, retrieved from URL<https://developers.googleblog.com/2017/03/xla-tensorflow-compiled.html>, 7 pages.
Hamilton et al., "Inductive representation learning on large graphs," Proceedings of the 31st International Conference on Neural Information Processing Systems, Dec. 2017, pp. 1025-1035.
Hestness et al., "Deep learning scaling is predictable, empirically," CoRR, Submitted on Dec. 1, 2017, arXiv:1712.00409v1, 19 pages.
Huang et al., "Gpipe: Efficient training of giant neural networks using pipeline parallelism," CoRR, Submitted on Nov. 20, 2018, arXiv:1811.06965v3, 10 pages.
International Preliminary Report on Patentability in International Appln. No. PCT/US2021/036250, mailed on Dec. 15, 2022, 8 pages.
International Search Report and Written Opinion in International Appln. No. PCT/US2021/036250, mailed on Sep. 22, 2021, 15 pages.
Jia et al., "Beyond data and model parallelism for deep neural networks," Proceedings of Machine Learning and Systems, Apr. 15, 2019, 1:1-13.
Jia et al., "TASO: optimizing deep learning computation with automatic generation of graph substitutions," Proceedings of the 27th ACM Symposium on Operating Systems Principles, Oct. 27, 2019, pp. 47-62.
Jozefowicz et al., "Exploring the limits of language modeling," CoRR, Submitted on Feb. 11, 2016, arXiv:1602.02410v2, 11 pages.
Karypis et al., "A fast and high quality multilevel scheme for partitioning irregular graphs," SIAM Journal on scientific Computing, Dec. 1998, 20(1):359-392.
Lattner et al., "MLIR Primer: A Compiler Infrastructure for the End of Moore's Law," Proceeding of International Symposium on Code Generation and Optimization (CGO), Feb. 16-20, 2019, 45 pages.
Mahajan et al., "Exploring the limits of weakly supervised pretraining," Proceedings of the European Conference on Computer Vision (ECCV), Sep. 8-14, 2018, pp. 185-201.
Mirhoseini et al., "A hierarchical model for device placement," Proceeding of International Conference on Learning Representations, Feb. 15, 2018, 11 pages.
Mirhoseini et al., "Chip placement with deep reinforcement learning," CoRR, Submitted on Apr. 22, 2020, arXiv:2004.10746v1, 15 pages.
Mirhoseini et al., "Device placement optimization with reinforcement learning," Proceeding of International Conference on Machine Learning (PMLR), Jul. 17, 2017, pp. 2430-2439.
Narayanan et al., "PipeDream: Generalized pipeline parallelism for DNN training," Proceedings of the 27th ACM Symposium on Operating Systems Principles, Oct. 2019, pp. 1-15.
Office Action in European Appln No. 21743313.5, mailed on Oct. 20, 2023, 4 pages.
Paliwal et al., "REGAL: Transfer learning for fast optimization of computation graphs," CoRR, Submitted on May 2019, arXiv:1905.02494v2, 12 pages.
Radford et al., "Language models are unsupervised multitask learners," OpenAI, Feb. 24, 2019, 24 pages.
Real et al., "Regularized evolution for image classifier architecture search," CoRR, Submitted on Feb. 5, 2018, arXiv:1802.01548v1, 15 pages.

(56) References Cited

OTHER PUBLICATIONS

Rotem et al., "Glow: Graph lowering compiler techniques for neural networks," CoRR, Submitted on May 4, 2018, arXiv: 1805.00907v2, 10 pages.

Schulman et al., "Proximal policy optimization algorithms," CoRR, Submitted on Aug. 28, 2017, arXiv:1707.06347v2, 12 pages.

Shazeer et al., "Outrageously large neural networks: The sparsely-gated mixture-of-experts layer," CoRR, Submitted on Jan. 23, 2017, arXiv:1701.06538v1, 19 pages.

Sutskever et al., "Sequence to sequence learning with neural networks," CoRR, Submitted on Dec. 14, 2014, arXiv:1409.3215v3, 9 pages.

Szegedy et al., "Rethinking the inception architecture for computer vision," CoRR, Submitted on Dec. 11, 2015, arXiv:1512.00567v3, 10 pages.

Van den Oord et al., "WaveNet: A generative model for raw audio," CoRR, Sep. 19, 2016, arXiv:1609.03499v2, 15 pages.

Vaswani et al., "Attention is all you need," Proceedings of the 31st International Conference on Neural Information Processing Systems, Dec. 2017, 11 pages.

Xu et al., "How powerful are graph neural networks?" Proceeding of International Conference on Learning Representations, May 6-9, 2019, 17 pages.

You et al., "Graph convolutional policy network for goal-directed molecular graph generation," CoRR, Submitted on Nov. 18, 2018, arXiv:1806.02473v2, 12 pages.

Zaremba et al., "Recurrent neural network regularization," CoRR, Submitted on Dec. 21, 2014, arXiv:1409.2329v4, 8 pages.

Zhou et al., "GDP: Generalized device placement for dataflow graphs," CoRR, Submitted on Sep. 28, 2019, arXiv:1910.01578v1, 11 pages.

* cited by examiner

LEARNED GRAPH OPTIMIZATIONS FOR COMPILERS

CROSS-REFERENCE TO RELATED APPLICATION

This application is a National Stage Application under 35 U.S.C. § 371 of International Application No. PCT/US2021/036250, filed on Jun. 7, 2021, which claims priority to U.S. Provisional Application Ser. No. 63/035,640, filed on Jun. 5, 2020. The disclosure of the prior applications are considered part of and are incorporated by reference in the disclosure of this application.

BACKGROUND

This specification relates to compiler optimization using machine learning.

Compiler optimization techniques aim to make executing a computer program more efficient, which can mean running in a shorter amount of time or requiring fewer computing resources, to name just two examples. Compilers often rely on hand-tuned heuristics that indicate under what conditions certain optimizations, e.g., loop unrolling, should be performed. In this sense, optimization means applying transformations to how a program operates, but does not imply that the result will be optimal or provide the best possible solution.

Machine learning (ML) frameworks have their own compiler optimization considerations. Many ML frameworks use compilers that operate on computer programs that define a graph structure that will be executed on a distributed system having many computers. In mapping a computational graph to machine code that executes on a collection of devices, ML compilers often need to solve many optimization problems, including graph rewriting, assignment of operations to devices, operation fusion, layout and tiling of tensors, and scheduling.

ML compilers typically apply heuristics to solve these problems individually, an approach that suffers from two key limitations. First, these heuristics often lead to sub-optimal configurations, especially for previously unseen model architectures. Second, by solving these problems in isolation, the compiler misses out on opportunities for joint optimizations across tasks.

Because of the complexity of such machine learning models, and the computing resources required to train such models, which compiler optimizations are employed and how can have a dramatic impact on the run time of both the training and inference processes.

SUMMARY

This specification describes techniques for using a compiler optimization network to learn compiler graph optimizations that are generalizable to unseen computation graphs. The compiler optimization network is a machine learning model having an architecture as described in more detail below.

A compiler optimization network as described in this specification can learn policies for a variety of compiler optimizations, including device assignment, scheduling, and operation fusion. These techniques are particularly useful for optimizing computer programs that themselves implement machine learning models because many machine learning models have or can be converted into a computational graph structure.

In order to make the resulting network generalizable, the network can be trained jointly over a set of computation graphs, which can be computation graphs from different machine learning domains. For example, recurrent networks typically have very different operation types and connection patterns compared to convolutional networks. The techniques described in this specification can be used to jointly train a compiler optimization network using input graphs from both domains. The resulting the resulting network is therefore generalizable to new computation graphs.

One example implementation of a compiler optimization model includes an end-to-end deep reinforcement learning (RL) model, where the learned policy is generalizable to new graphs and transferable across multiple tasks. Specifically, the example RL model includes an inductive graph-embedding network that encodes operation features and dependencies in a trainable graph representation, followed by a policy network of segmented recurrent attention layers. The policy network transforms the graph representations into an optimization decision with soft attention. These two networks can be jointly trained in an end-to-end fashion using a supervised reward. To generalize to arbitrary and held-out graphs, the RL model can be trained jointly over a set of computation graphs (instead of one at a time) and then fine-tuned on new graphs. By transferring the learned graph embeddings and optimization policies, the RL model can converge faster using fewer resources.

On empirical data, the resulting compiler optimization networks can outperform state-of-the-art compiler optimizations in terms of the resulting run time of the input programs. In addition, they generalize well to unseen graphs.

The training process tends to converge faster as well because the compiler optimization network can generate decisions on the entire graph in a single-shot fashion rather than operating on each individual node or group of nodes in the graph. The training process has been demonstrated in real-world experiments to converge $15x$ faster, or more, than other state-of-the-art techniques.

The techniques described in this specification can be implemented using a system with computer programs on one or more computers in one or more locations that performs compiler optimizations for a machine learning task configured to process a network input.

The machine learning task can be any appropriate machine learning task that (i) operates on a network input that is an input sequence, (ii) generates a network output that is an output sequence, or (iii) both. In some implementations, the machine learning task is defined by a computation graph.

Some examples of machine learning tasks that the system can be configured to perform compiler optimizations for include the following examples.

As one example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram, a waveform, or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient. Such electronic health record data may comprise physiological data relating to a patient, such as blood glucose, blood pressure, body temperature, heartrate or the like. Examples of adverse health events comprise hypo- and/or hyper-glycemic events, heart attacks, strokes or the like.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an image generation task, where the input is a conditioning input and the output is a sequence of intensity value inputs for the pixels of an image.

As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent. Examples of observations or other data characterizing states of an environment comprise sensor data related to the agent, such as visual data, LIDAR readings, sonar readings, or the like. The output defines an action to be performed by the agent may comprise control signals for controlling the agent to perform the action, or data that may be converted to such signals.

As another example, the task can be a genomics task, where the input is a sequence representing a fragment of a DNA sequence or other molecule sequence and the output is either an embedding of the fragment for use in a downstream task, e.g., by making use of an unsupervised learning technique on a data set of DNA sequence fragments, or an output for the downstream task. Examples of downstream tasks include promoter site prediction, methylation analysis, predicting functional effects of non-coding variants, and so on.

As mentioned above, the compiler optimization network can be trained on a graph for one of these machine learning task examples or jointly on multiple graphs for multiple types of these machine learning task examples.

Particular embodiments of the subject matter described in this specification can be implemented so as to realize one or more of the following advantages. The techniques described in this specification enable the creation of a compiler optimization network that outperforms state-of-the-art methods in terms of the resulting runtime of the input programs. In particular, the techniques described below outperform a network having only a graph embedding network in placement performance. In addition, the techniques described below are faster than processing large sequence lengths compared to networks having LSTM policy networks instead of attention layers. Lastly, the techniques described below handle large graphs much better than graph attention networks.

When input programs have better optimizations, a system can learn better and more sophisticated models in less time. In addition, the techniques described below generalize well to unseen graphs, and the training process converges faster than known methods. Furthermore, the optimizations generated by the network can be output in a one-shot fashion. The compiler optimization network can also be augmented to jointly solve multiple optimization problems without incurring significantly more parameters or training time. In addition, unlike other existing approaches, the techniques described below are scalable to very large computation graphs that include 10 k, 50 k, or 100 k or more computation nodes.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes techniques for training a compiler optimization network. These techniques can be used to train the network to learn how to utilize a number of different candidate computational graph optimizations. The following example graph optimization problems will be discussed in detail.

A first example optimization is device placement. Given a computational graph, the goal of device placement is to learn a policy that assigns a device D for all nodes in a given graph G, to maximize a reward $r_{G,D}$, which can be defined based on run time of the resulting optimized graph. Such devices may include, for example, CPU cores, GPUs, TPUs, FGPAs or the like.

A second example optimization is operation scheduling. An operation ("op") in a dataflow graph is ready to run when its incoming tensors are present in the device memory. A frequently used scheduling strategy is to maintain a ready queue of operations for each device and schedule operations in first-in-first-out order. However, such schedules can be sub-optimal especially when the operations are distributed across a set of devices. Sub-optimal schedules typically exhibit underutilized devices since ops for these devices are blocked on producer ops in ready queues of other devices. We propose a priority-based scheduler where the scheduler maintains a priority queue of ready operations for each device and schedules the highest priority operation in the queue first. Similar to device placement, operation scheduling can be formulated as the problem of learning a policy that assigns a scheduling priority P for all ops in the graph to maximize a reward $r_{G,P}$, which can also be defined based on run time of the resulting optimized graph.

A third example optimization is operation fusion ("op fusion"). Op fusion is the process of merging multiple ops into a single op.

Figure 1A:
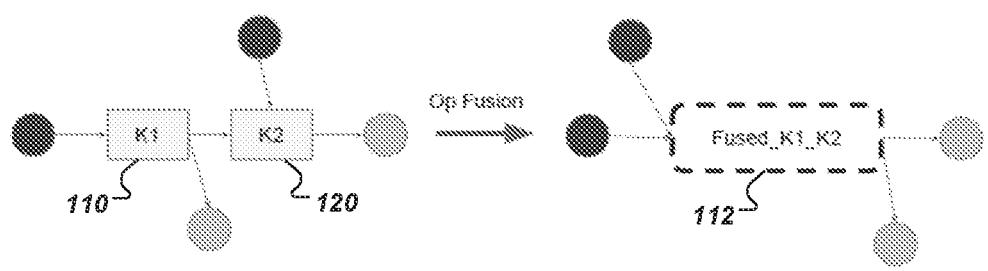
FIGS. 1A-1B illustrate example operation fusion optimizations.

FIG. 1A illustrates an example of an op fusion optimization. In FIG. 1A, op K1 110 is producing an output which is consumed by op K2 120. If these two ops are fused into a fused kernel 112, the intermediate data produced by K1 110 is immediately used for K2 120 when K1 110 finishes on the device, without the need to perform read and write transactions with the global memory, thereby reducing the communication overhead.

Figure 1B:
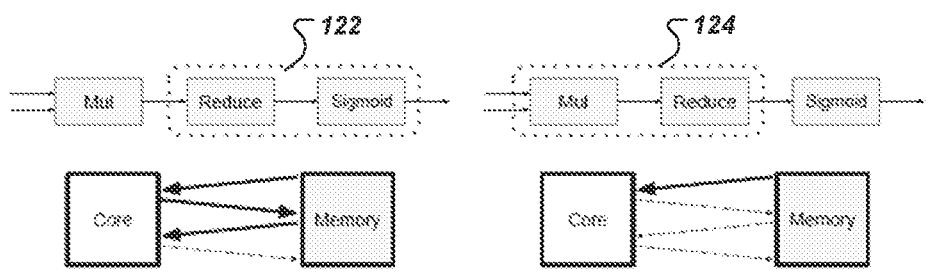

FIG. 1B illustrates an example of how the decision of which ops to fuse can change application performance. In this case, the graph includes an element-wise multiplication (Mul), a reduction (Reduce), and a sigmoid function (Sigmoid) connected to each other as shown.

Should an optimization process choose Reduce and Sigmoid for fusion (left), the performance will not improve much, since the amount of intermediate values transferred to or from the memory will not change significantly.

On the other hand, if an optimization process selects Mul and Reduce (right) to be fused, the intermediate tensor after the multiplication will potentially stay in faster memory for the Reduce op. Therefore, the amount of transferred data from or to global memory has decreased dramatically. Simple strategies like considering ops in topological order can make inefficient fusion decisions and lead to suboptimal performance.

To address this, op fusion can be reformulated as a priority-based ordering problem: learning a policy that assigns a fusion priority F for all ops in the graph to maximize a reward $r_{G,F}$ defined based on run time. Each node can be associated with a fusion priority score F, where the size of F can be a hyperparameter of the network. The scores can then be used to determine the order in which nodes are fused.

Another advantage of the techniques described in this specification is that instead of being limited to learning the features of a single graph, the objective for the compiler optimization network is to simultaneously reduce the expected run time of the optimization over multiple dataflow graphs:

$$J(\theta) = \mathbb{E}_{G \sim \mathcal{G}, T \sim \pi_\theta(G)}[r_{G,T}],$$

where $T \in \{D, P, F\}$ denotes the task, $\theta$ denotes the parameters of the RL policy, and $\mathcal{G}$ denotes an empirical distribution of dataflow graphs.

In addition, these techniques can be extended to handle multiple tasks jointly. The multi-task objective can be expressed as:

$$J(\theta) = \mathbb{E}_{G \sim \mathcal{G}, P \sim \pi_{\theta_P}(G), F \sim \pi_{\theta_F}(g)}[r_{G,D,P,F}].$$

Parameters across the three tasks can be partially shared: $\theta_T = (\phi, \psi_T)$, where $T \in \{D, P, F\}$, $\phi$ denotes the shared parameters and $\phi_T$ denotes task-specific parameters. The shared policies can be parameterized in the form of multiple recurrent attention layers.

Figure 2:
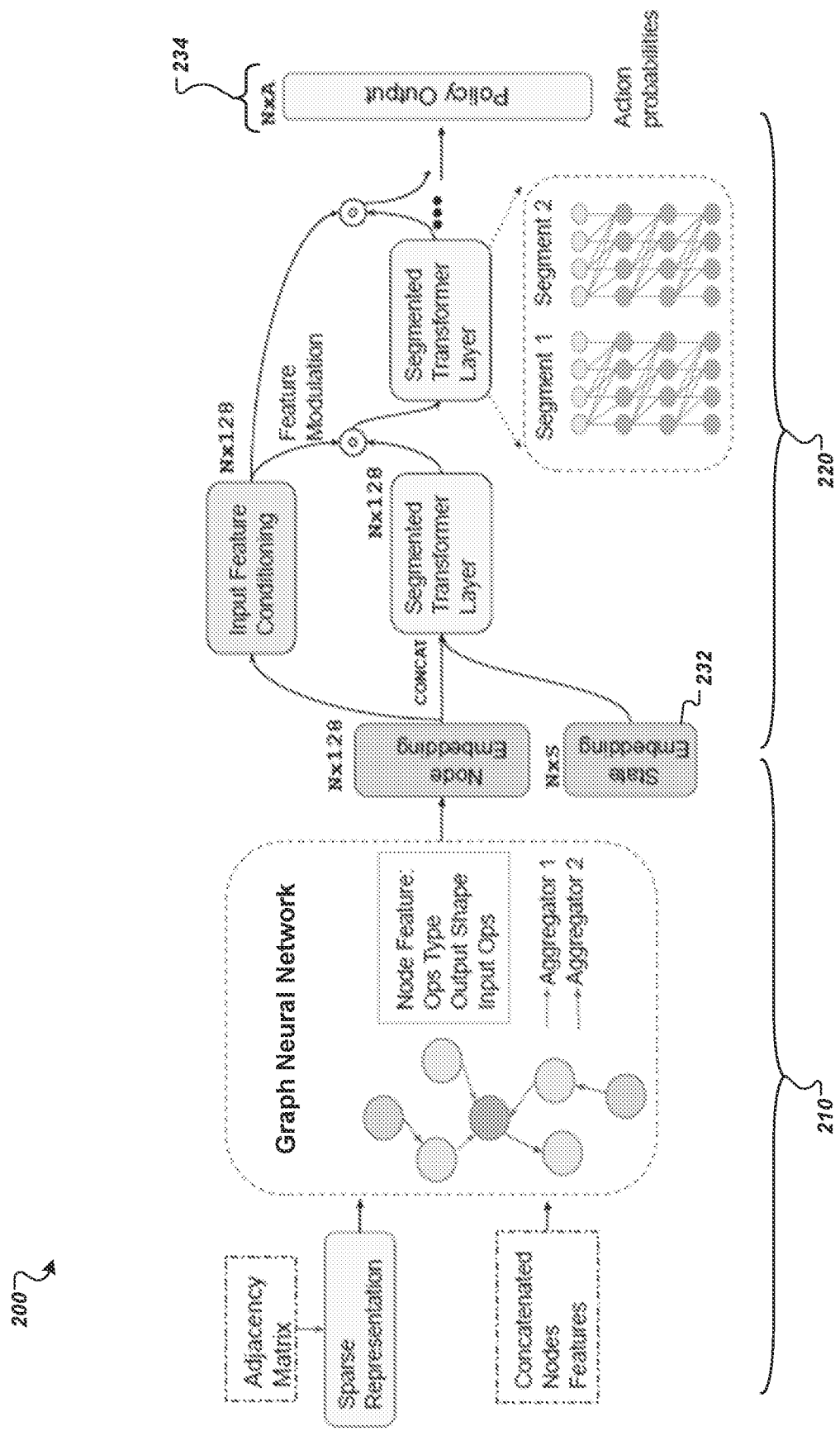
FIG. 2 is a diagram that illustrates an example architecture for a compiler optimization network.

FIG. 2 is a diagram that illustrates an example architecture for a compiler optimization network 200. The architecture is an example of a network that can be used to learn how to solve a number of different computational graph optimization problems in a way that generalizes to unseen graphs.

The compiler optimization network 200 includes a graph embedding network 210 followed by a policy network 220, which can be jointly trained in an end-to-end fashion. The graph embedding network 210 can learn a graph representation $h_G$ of a computational graph, and the decision policy 220 can learn a optimization strategy p(y|G) over a given graph representation.

The goal for the compiler optimization network can to compute an action distribution for a node in the graph based on the actions of all previous nodes in an auto-regressive manner, which can be expressed as:

$$p(y \mid G) = \prod_{i=1\ldots N} p(y_i \mid h_G, y_{i-1}, y_{i-2}, \ldots)$$

where $y_i$ is the action for the ith node.

If N is very large, e.g., more than 1K, 10K, or 100K nodes, which is a common situation for modern computational graphs, it may be infeasible to compute all the $y_i$'s sequentially.

Therefore, an iterative and non-autoregression process can be used as an approximation, which can be expressed as:

$$p(y^{(t)} \mid G) = \prod_{i=1\ldots N} p(y_i^{(t)} \mid h_G, y^{(t-1)}).$$

The N sampling procedures can now be carried out in parallel within each iteration t. Decisions over the N nodes are allowed to mutually influence each other because the process above can be repeated for T times, where T<<N. The distribution of y(t) can be informed by y(t−1), the actions made over all the nodes in the previous iteration.

In terms of network implementation, the temporal dependencies between actions in multiple RL steps can be carried out by a state embedding 232 such that the state of the previous step is used as an input to the network in the next step. The actions are then produced by the final layer 234 in FIG. 2. In addition, the network can include one or more Transformer layers with residual connections as task heads.

The architecture of the compiler optimization network 200 is designed to be invariant over the underlying graph topology, enabling the same learned policy to be applied to a wide range of input graphs. In some implementations, the compiler optimization network 200 can optimize the objective function above described in Section 3 using a Proximal Policy Optimization for improved sample efficiency.

The graph embedding network 210 is designed to capture topological information encoded in the computation graph and can be implemented, for example, using a graph neural network (GNN). One example of a suitable graph neural network is GraphSAGE, which is an inductive network that leverages node attribute information to generalize to previously unseen data. In addition, the system can use the feature aggregation scheme proposed in GraphSAGE and to a general, end-to-end graph optimization method for a wide range of computation graphs.

Nodes and edges in the computation graph can be represented as the concatenation of their meta features, e.g., operation type and output shape. The nodes and edges are then further encoded by the graph embedding network into a trainable representation. The graph embedding process can take multiple iterations, and the computation procedure for the l-th iteration can proceed as follows. First, each node v∈V aggregates the feature) representations of its neighbors $\{h_u^{(l)}, \forall u \in \mathcal{N}(v)\}$, into a single vector $h_{\mathcal{N}(v)}^{(l)}$.

This aggregation outcome is a function of all previously generated representations, including the initial representations defined based on the input node features. The aggregation function can use the following form with max pooling:

$$h_{\mathcal{N}(v)}^{(l)} = \max(\sigma(W^{(l)} h_u^{(l)} + b^{(l)}, \forall u \in \mathcal{N}(v)),$$

where ($W^{(l)}$, $b^{(l)}$) define an affine transform and σ stands for the sigmoid activation function. The node's current representation, $h_v^{(l)}$, is then concatenated with the aggregated neighborhood vector, $h_{\mathcal{N}(v)}^{(l)}$, and the concatenated vector is processed through a fully connected layer $f^{(l+1)}$.

Unlike other graph neural networks including GraphSAGE, parameters in the graph embedding network 210 can be trained jointly with a decision network via stochastic gradient descent with PPO, in a supervised fashion. In addition, when enhanced with a global attention network discussed below, the optimal layers are smaller.

In graph optimization problems, the optimal actions for a node are often influenced by actions for other nodes in the graph. While a graph neural network is a suitable feature aggregation network, GNNs often lack the ability to track global node dependencies in a scalable fashion. In contrast, an attention network can learn this dependency and the relative importance of dependencies across an entire graph.

In addition to tracking dependencies in a scalable fashion, handling large computational graphs in the compilation stacks is another practical concern when designing the compiler optimization network, which should be able to handle computational graphs from realistic workloads having over 10,000 nodes.

LSTM-based models proposed for language tasks usually target a shorter sequence length, incurring vanishing (and exploding) gradients or substantially longer training time. Although hierarchical grouping has been used to address longer sequences in a LSTM-based network, the proposed grouper network comes with limited flexibility and generality. And the non-differentiable grouping procedure prevents training the networks end-to-end.

Instead, a Transformer-based attentive network can be used to generate the optimization decision in an end-to-end fashion as shown in FIG. 2. Because the graph embedding already includes topological information for each node, the positional embedding can be removed in the original transformer to prevent the model from overfitting node identifications.

In order to capture long-term dependencies efficiently among a large set of nodes, segment-level recurrence introduced in Transformer-XL can be used, where hidden states computed for the previous set of nodes are cached with gradient flows disabled and reused as an extended context during the training of the next segment. Besides achieving extra long context, the segment-level recurrent attention is much faster than a LSTM-based method.

One of the key goals of this work is to ensure the generalizability of the network over a wide variety of graphs from potentially different application domains (e.g. computer vision, language, and speech). Not only do these graphs vary in the number of operations from a few thousand to a million, but they also have drastically different network architectures, in terms of computational operations, data shape, and network topology. As an example, recurrent networks have completely different operation types and connections compared to convolutional networks that are widely used in computer vision. A naïve strategy of training the shared policy network with batches of heterogeneous graphs is unlikely to perform as well as networks exclusively trained for a particular type of graph.

To overcome this limitation, we propose a feature modulation mechanism similar to parameter superposition. The idea is to re-weight network parameters by generating a feature modulation layer based on the input graph features as shown in FIG. 2, to mitigate the potentially undesirable interference among different input graphs. The feature modulation layer is dot multiplied with all intermediate feature maps in the decision network:

$$x^{(l+1)} = a^{(l)}(m(h_G) \odot x^{(l)}),$$

where $a^{(l)}$ stands for an attention layer in the network, m stands for the feature modulation layer, and $h_G$ is the feature representation of the input graph generated by the graph-embedding network. The feature modulation layer can be implemented with minimum overhead by adding an additional transformer layer to the decision network. The output of the modulation layer can then be defined as the last-layer features of the additional transformer.

Figure 3:
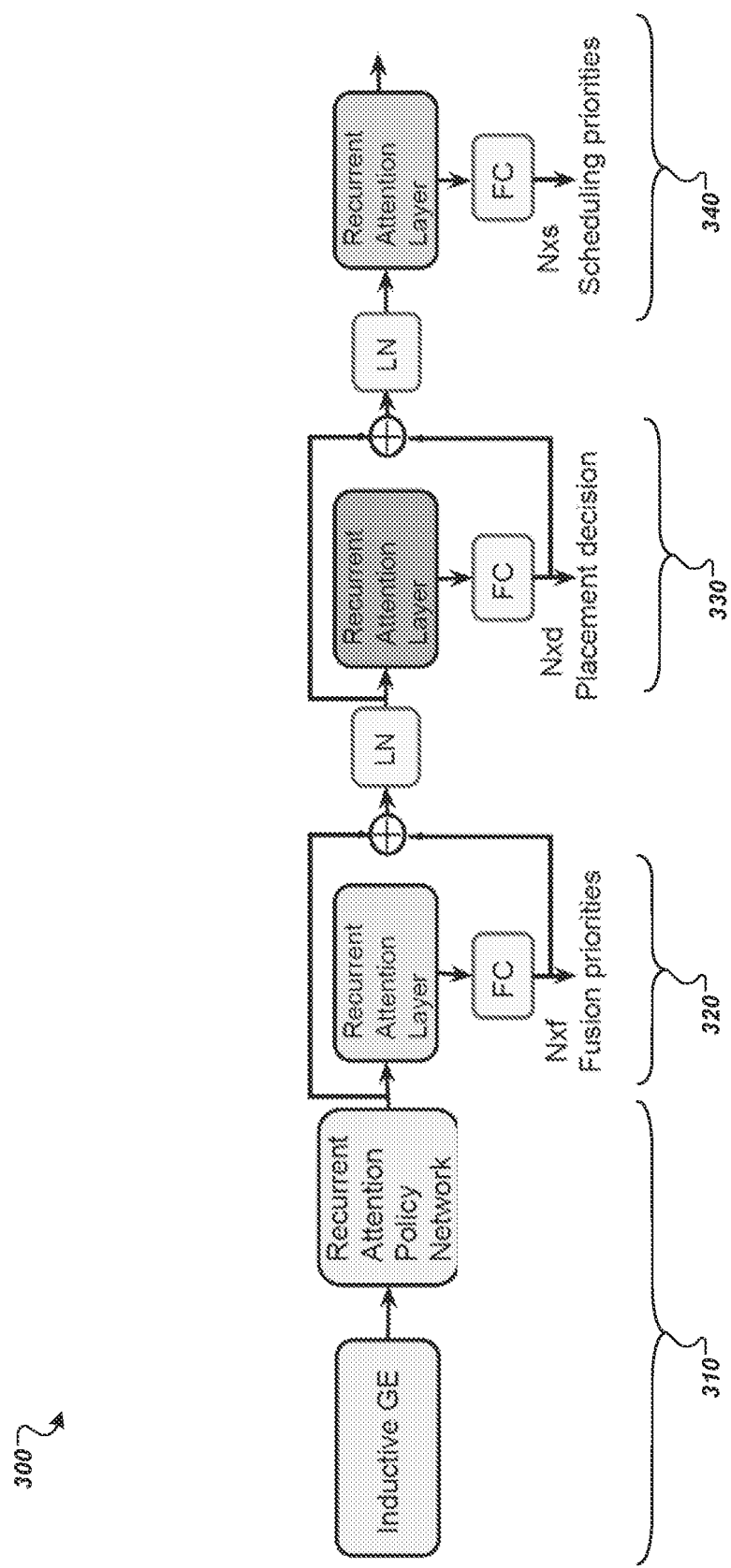
FIG. 3 illustrates how a compiler optimization network can be augmented to jointly solve multiple optimization problems.

FIG. 3 illustrates how a compiler optimization network can be augmented to jointly solve multiple optimization problems. The generality of the compiler optimization network presented above allows jointly solving multiple dependent graph optimization problems without introducing significant parameters or training time. A recurrent attention policy network can be used that not only applies a segment-level recurrent attention to the graph representation spatially, but also generates recurrent actions for multiple optimization problems through residual connections and parameter sharing across multiple recurrent attention layers.

In FIG. 3, the network 300 includes the policy network 310 described above that is augmented by three additional recurrent attention layers 320, 330, and 340. In this example, the first recurrent attention layer 320 is for the fusion optimization problem, the second recurrent attention layer 330 is for the placement optimization problem, and the third recurrent attention layer 340 is for the scheduling optimization problem.

Compared to the single-problem policy net, FIG. 3 shows that the multi-problem network introduces just one recurrent attention layer for each additional optimization problem to be solved, and the parameters are shared across the different optimization problems. The recurrent attention layers with residual connections of actions enables tracking inter-problem dependencies.

Figure 4:
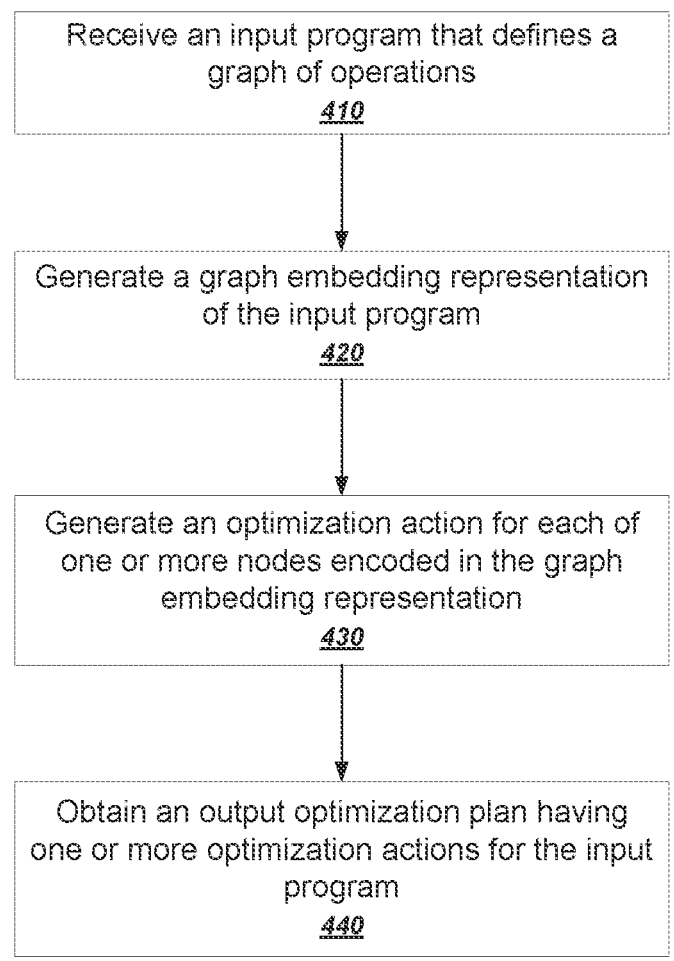
FIG. 4 is a flowchart of an example process for using a compiler optimization network to generate an optimization plan for an input program.

FIG. 4 illustrates a multi-problem policy network including a spatial recurrent attention that attends to the input sequence (the recurrent attention policy network) and temporal recurrent attention that attends to the problem sequence (the multi-problem recurrent attention layers). For the t-th problem, the recurrent attention layer can compute the its hidden state $H^t$ and action $A^t$ as follows:

$$H^t = LN(Concat(A^{t-1}, H^{t-1}))$$

$$A^t = FC(MultiHeadAttn(H^t))$$

where LN stands for layer normalization, and MultiHeadAttn stands for a multi-head attention layer whose parameters are shared across layers. FC is a fully-connected layer that can include a rectified-linear activation between two affine transformations, applied position-wise, that projects the hidden state to the action space of the problem.

FIG. 4 is a flowchart of an example process for using a compiler optimization network to generate an optimization plan for an input program. The process will be described as being performed by a system of one or more computers in one or more locations and programmed appropriately in accordance with this specification.

The system receives an input program that defines a graph of operations (410). As described above, a computation graph has nodes and edges with node in the graph representing an operation, which can be implemented in software by a particular operation module. Each edge between nodes in the graph representing one operation receiving the output generated by another operation.

The system can then provide the input program to a compiler optimization network having a graph-embedding network and a policy network. As described above, the compiler optimization network can be trained for a single computation graph or for multiple different computation graph representing different respective computing tasks, which for example, can be programs for training machine learning models, possibly from different machine-learning domains. In addition, the compiler optimization network described in this specification can be trained end-to-end over both the graph-embedding network and the policy network.

The system generates a graph embedding representation of the input program (420). As described above, the system can implement a graph-embedding network that is configured to encode operation features and operation dependencies of the operation modules of the input program into a graph embedding representation. For example, the system can use the graph-embedding network to iteratively aggregate respective feature representations for one or more neighboring nodes of each node in the graph.

The system generates an optimization action for each of one or more nodes encoded in the graph embedding representation (430). The system can use a policy network that is configured to generate an optimization action for each of one or more nodes encoded in the graph embedding representation. In some implementations, the policy network includes a feature modulation layer that is configured to re-weight network parameters. In some implementations, the system can use segment-level recurrent attention to solve multiple optimization problems concurrently.

The system obtains an output optimization plan having one or more optimization actions for the input program (440). The optimization actions that are generated depends on the optimization problem being solved. For example, if the optimization problem is scheduling, the output of the compiler optimization network can be a value representing a respective scheduling priority for each of one or more nodes in the graph. If the optimization problem is device placement, the output of the compiler optimization network can be an assignment of each operation in the graph to a particular device, with each device potentially being assigned multiple nodes in the graph. And if the optimization problem is operation fusion, each node can be associated with a respective fusion priority score, which represents an order in which nodes should be fused.

The system can then scheduling the input program for execution on the one or more devices using the output optimization plan generated by the compiler optimization network. For example, the system can assign nodes to devices according to the output of the network, schedule operations according to the output of the network, or fuse nodes in an order according to the output of the network.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input.

An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A computer-implemented method performed by a system comprising one or more computers and configured to execute a compiler optimization network, the method comprising:
receiving an input program, wherein the input program defines a graph of operation modules, wherein each node in the graph is a respective operation module, and each edge between nodes in the graph represents one operation module receiving the output generated by another operation module;

providing a representation of the input program to the compiler optimization network comprising:
  a graph-embedding network executable by the system that is configured to encode operation features and operation dependencies of the operation modules of the input program into a graph embedding representation, and
  a policy network executable by the system that is configured to generate an optimization action for each of one or more nodes encoded in the graph embedding representation, wherein the policy network employs segmented recurrent attention layers to concurrently generate optimization actions for multiple different tasks, wherein each layer of the segmented recurrent attention layers is dedicated to generating a respective optimization action for a different task of the multiple different tasks;

obtaining, from the compiler optimization network, an output optimization plan comprising one or more optimization actions for each of the multiple different tasks of the input program; and executing the input program using the output optimization plan.

2. The method of claim 1, wherein executing the input program using the output optimization plan further comprises:
  scheduling the input program for execution on the one or more devices using the output optimization plan generated by the compiler optimization network.

3. The method of claim 1, further comprising performing a graph-embedding process using the graph-embedding network comprising iteratively aggregating respective feature representations for one or more neighboring nodes of each node in the graph.

4. The method of claim 1, wherein the policy network includes a feature modulation layer that is configured to re-weight network parameters.

5. The method of claim 1, further comprising jointly training the compiler optimization network over a set of N different dataflow graphs.

6. The method of claim 5, wherein the N different dataflow graphs represent programs for training machine learning models in different machine-learning domains.

7. The method of claim 1, wherein training the compiler optimization network comprises training the compiler optimization network end-to-end over both the graph-embedding network and the policy network.

8. The method of claim 1, wherein the policy network generates recurrent actions for multiple using residual connections and parameter sharing across multiple recurrent attention layers.

9. The method of claim 1, wherein the compiler optimization network implements a policy that specifies whether two operation modules should be fused.

10. The method of claim 1, wherein the compiler optimization network implements a policy that assigns placement of operation modules to particular devices.

11. The method of claim 1, wherein the compiler optimization network implements a policy that assigns a scheduling priority for a plurality of operation modules in the graph.

12. A system configured to execute a compiler optimization network, the system comprising:
  one or more computers and one or more storage devices storing instructions that are operable, when executed by the one or more computers, to cause the one or more computers to perform operations comprising:
  receiving an input program, wherein the input program defines a graph of operation modules, wherein each node in the graph is a respective operation module, and each edge between nodes in the graph represents one operation module receiving the output generated by another operation module;
  providing a representation of the input program to the compiler optimization network comprising:
    a graph-embedding network executable by the system that is configured to encode operation features and operation dependencies of the operation modules of the input program into a graph embedding representation, and
    a policy network executable by the system that is configured to generate an optimization action for each of one or more nodes encoded in the graph embedding representation, wherein the policy network is configured to employ segmented recurrent attention layers to concurrently generate optimization actions for multiple different tasks, wherein each layer of the segmented recurrent attention layers is dedicated to generating a respective optimization action for a different task of the multiple different tasks;
  obtaining, from the compiler optimization network, an output optimization plan comprising one or more optimization actions for each of the multiple different tasks of the input program; and
  executing the input program using the output optimization plan.

13. The system of claim 12, wherein executing the input program using the output optimization plan further comprises:
  scheduling the input program for execution on the one or more devices using the output optimization plan generated by the compiler optimization network.

14. The system of claim 12, wherein the operations further comprise performing a graph-embedding process using the graph-embedding network comprising iteratively aggregating respective feature representations for one or more neighboring nodes of each node in the graph.

15. The system of claim 12, wherein the policy network includes a feature modulation layer that is configured to re-weight network parameters.

16. The system of claim 12, wherein the operations further comprise jointly training the compiler optimization network over a set of N different dataflow graphs.

17. The system of claim 16, wherein the N different dataflow graphs represent programs for training machine learning models in different machine-learning domains.

18. One or more non-transitory computer storage media encoded with computer program instructions that when executed by one or more computers cause the one or more computers to perform operations for a system comprising one or more computers and configured to execute a compiler optimization network, the operations comprising:
  receiving an input program, wherein the input program defines a graph of operation modules, wherein each node in the graph is a respective operation module, and each edge between nodes in the graph represents one operation module receiving the output generated by another operation module;

providing a representation of the input program to the compiler optimization network comprising:

a graph-embedding network executable by the system that is configured to encode operation features and operation dependencies of the operation modules of the input program into a graph embedding representation, and a policy network executable by the system that is configured to generate an optimization action for each of one or more nodes encoded in the graph embedding representation, wherein the policy network is configured to employ segmented recurrent attention layers to concurrently generate optimization actions for multiple different tasks, wherein each layer of the segmented recurrent attention layers is dedicated to generating a respective optimization action for a different task of the multiple different tasks;

obtaining, from the compiler optimization network, an output optimization plan comprising one or more optimization actions for each of the multiple different tasks of the input program; and executing the input program using the output optimization plan.

19. The one or more non-transitory computer storage media of claim 18, wherein executing the input program using the output optimization plan further comprises:
scheduling the input program for execution on the one or more devices using the output optimization plan generated by the compiler optimization network.

20. The one or more non-transitory computer storage media of claim 18, the operations further comprising performing a graph-embedding process using the graph-embedding network comprising iteratively aggregating respective feature representations for one or more neighboring nodes of each node in the graph.

\* \* \* \* \*